Dec. 22, 1931. H. B. NEWTON ET AL 1,837,725
LAWN MOWER
Original Filed Sept. 17, 1929
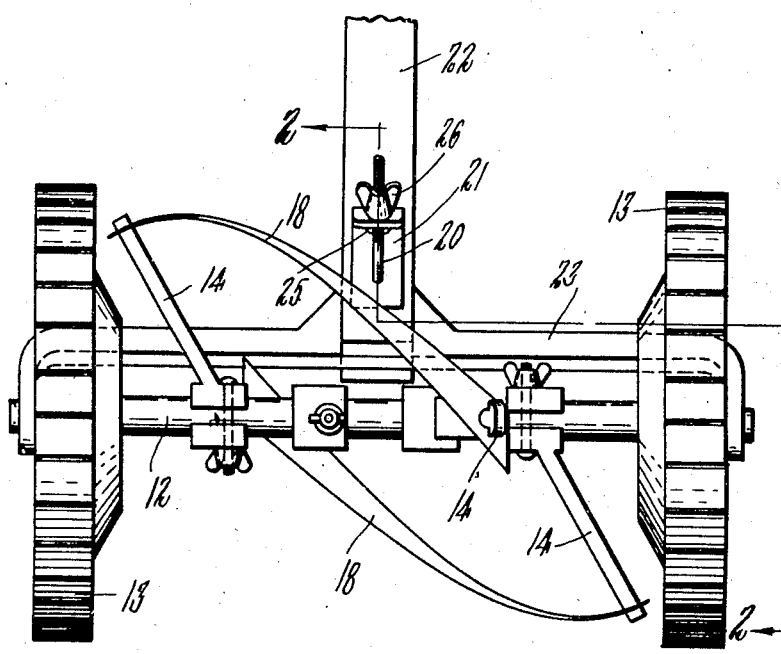
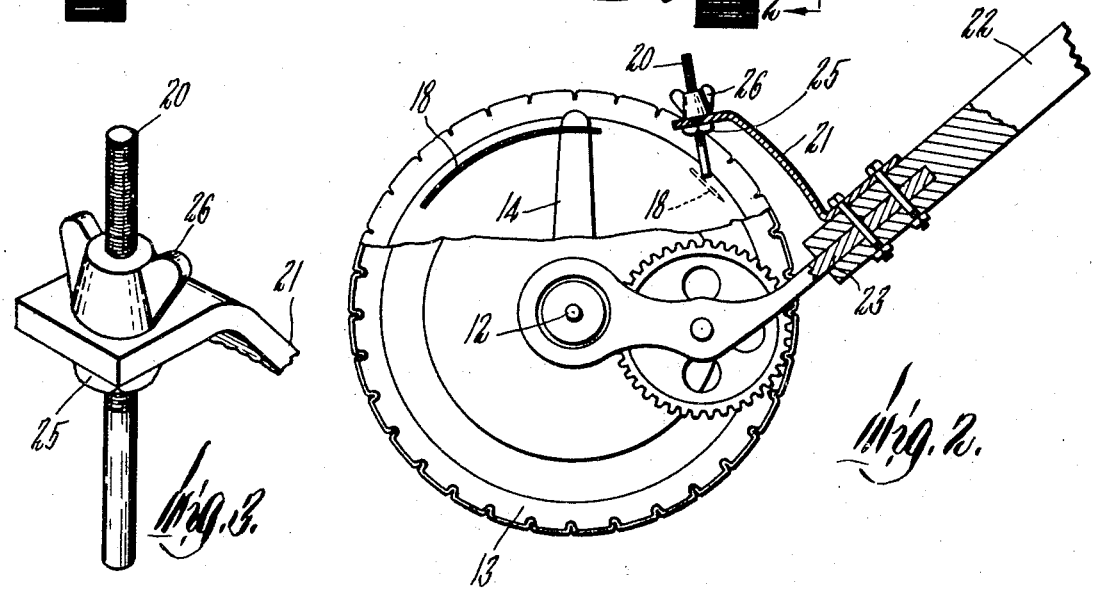
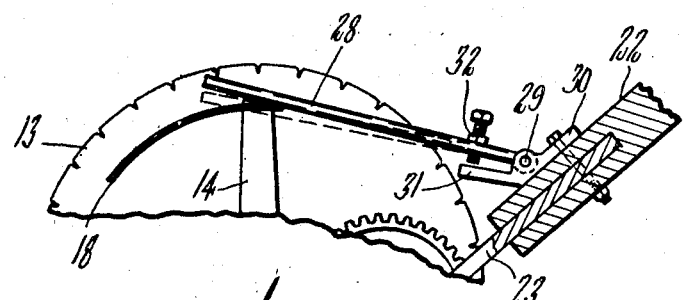
Inventors:
Herbert B. Newton,
Thomas C. Newton, Patented Dec. 22, 1931

1,837,725

UNITED STATES PATENT OFFICE

HERBERT B. NEWTON AND THOMAS C. NEWTON, OF BROOKLINE, MASSACHUSETTS, ASSIGNORS TO AUTO SICKLE COMPANY, OF BOSTON, MASSACHUSETTS, A CORPORATION OF MASSACHUSETTS

LAWN MOWER

Application filed September 17, 1929, Serial No. 393,160. Renewed June 2, 1931.

This invention relates to a lawn mower which includes an axle supported by traction wheels and driven by mechanism which includes said wheels, and resilient cutting blades connected with the axle, and revolved by the rotation thereof to cut grass, the cutting being acomplished entirely by the revolving blades.

A lawn mower thus characterized is disclosed by Letters Patent of the United States granted to Herbert B. Newton April 5, 1927, No. 1,623,433.

The resilient blades are freely flexible, and their end portions are connected with the axle by arms fixed to the latter, the blades being free to be flexed inward toward the axle between their end portions.

The object of the present invention is to provide means for flexing inward a portion of each blade between its ends, and permitting a return thereof to its normal form when the blade is away from or out of its cutting position, thereby jarring the blade and detaching therefrom any cut grass which may adhere thereto.

Of the accompanying drawings forming a part of this specification,—

Figure 1 is a front view of a lawn mower having jarring means embodying the invention.

Figure 2 is a section on line 2—2 of Figure 1, looking toward the left, portions of the mower being shown in end elevation.

Figure 3 shows in perspective the portions of the blade-jarring means shown by Figures 1 and 2.

Figure 4 is a fragmentary view showing a modification.

The same reference characters indicate the same parts in all of the figures.

In the drawings, 12 designates an axle supported and adapted to be rotated by traction wheels 13 at opposite end portions of the axle.

Attached to the axle are spider arms 14, whose outer ends are engaged with end portions of flexible blades 18.

Each blade is made from a resilient strip of steel sharpened at one or both of its longitudinal edges.

The blades 18 are free to be flexed inward toward the axle between their end portions, and the present invention is characterized by jarring means fixed to a suitable element of the machine and supported in the path of the blades to encounter each blade when the latter is away from its cutting position and briefly flex the blade inward and then permit it to spring outward, so that the blade is jarred to detach cut grass which may adhere thereto.

In the embodiment of the invention shown by Figures 1, 2 and 3 of the drawings, the jarring means comprises a stud 20 and an ear 21 fixed, in this instance, to the propelling element which moves the lawn mower progressively, said element, as shown by the drawings, including a handle or push bar 22 and angular arms 23 fixed thereto, the arms constituting a fork in which the ends of the axle 12 are journalled, the ear 21 of the jarring means being attached, in this instance, to the member 22 of the propelling means.

The arrangement is such that the lower end portion of the stud 20 projects sufficiently into the circular path in which the blades 18 revolve, to encounter each blade when the latter is away from or above its cutting position and briefly flex the blade inward toward the axle and then permit the blade to spring outward. The blade is thus jarred so that any cut grass that may adhere thereto is detached.

The stud 20 of the deflecting means passes through an orifice in the ear 21 and is rendered adjustable endwise by clamping nuts 25 and 26 engaged with a threaded portion of the stud, the nut 25 bearing on one side of the ear 21, and the nut 26, which is preferably a wing nut, bearing on the opposite side of said ear.

In the modification shown by Figure 4, we embody the jarring means in a hammer 28 pivoted at 29 to a bracket 30 fixed to the member 22, and adapted to oscillate vertically, its downward movement being limited by adjustable stop means including an ear 31 on the bracket and a screw 32 engaged with the inner end portion of the hammer and arranged to abut said ear. The hammer, when in its normal position shown by dotted lines, encounters and inwardly flexes the blade 18 and is raised by the latter as indicated by full lines, the hammer being suitably weighted so that its encounter with the blade jars the latter.

We claim:—

1. In a lawn mower which includes a cutting element comprising flexible resilient blades arranged about a driving axle, the blades being free to be flexed inward toward the axle between their end portions; a blade deflector supported in the path of the blades by another element of the mower and arranged to jar each blade when the latter is away from its cutting position, and thereby detach cut grass from the blade.

2. In a lawn mower which includes a cutting element comprising flexible resilient blades arranged about a driving axle, the blades being free to be flexed inward toward the axle between their end portions, and propelling means associated with the axle; a blade deflector fixed to said propelling means and arranged to encounter each blade when the latter is away from its cutting position and jar the blade to detach cut grass therefrom.

3. In a lawn mower which includes a cutting element comprising flexible resilient blades arranged about a driving axle, the blades being free to be flexed inward toward the axle between their end portions, and propelling means associated with the axle; blade-deflecting means comprising an ear fixed to said propelling means and overhanging the path of movement of the blades, and a stud secured to said ear and projecting into said path, said stud being arranged to encounter each blade when the latter is away from its cutting position and jar the blade to detach cut grass therefrom.

4. In a lawn mower which includes a cutting element comprising flexible resilient blades attached to a driven axle; means for jarring the blades when out of cutting position to detach cut grass which may adhere thereto.

In testimony whereof we have affixed our signatures.

HERBERT B. NEWTON.
THOMAS C. NEWTON.